(12) United States Patent
Sandberg et al.

(10) Patent No.: US 10,012,124 B2
(45) Date of Patent: Jul. 3, 2018

(54) ANGLED AND COMPACT EXHAUST GAS AFTERTREATMENT DEVICE

(71) Applicant: VOLVO CAR CORPORATION, Gothenburg (SE)

(72) Inventors: Peter Sandberg, Gothenburg (SE); Marie Stenfeldt, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 324 days.

(21) Appl. No.: 14/746,397

(22) Filed: Jun. 22, 2015

(65) Prior Publication Data

US 2015/0377110 A1 Dec. 31, 2015

(30) Foreign Application Priority Data

Jun. 27, 2014 (EP) .................................. 14174777

(51) Int. Cl.
*F01N 3/28* (2006.01)
*B01D 53/94* (2006.01)
(Continued)

(52) U.S. Cl.
CPC ....... *F01N 3/2892* (2013.01); *B01D 53/9477* (2013.01); *F01N 3/108* (2013.01);
(Continued)

(58) Field of Classification Search
None
See application file for complete search history.

(56) References Cited

U.S. PATENT DOCUMENTS 8,978,366 B2   3/2015  Brugger
2003/0108457 A1*  6/2003  Gault .................... F01N 3/0211
                                                  422/177
(Continued)

FOREIGN PATENT DOCUMENTS

DE       102010034705 A1    2/2012
WO          0142630 A2    6/2001
WO     WO 2014072717 A1 *  5/2014  .......... F01N 13/009

OTHER PUBLICATIONS

Extended European Search Report dated Aug. 29, 2014, Application No. 14174777.4-1603, Applicant Volvo Car Corporation, 5 Pages.

*Primary Examiner* — Walter D. Griffin
*Assistant Examiner* — Jelitza M Perez
(74) *Attorney, Agent, or Firm* — Brooks Kushman P.C.

(57) ABSTRACT

An exhaust gas aftertreatment device for an internal combustion engine comprises a housing, first and second catalytic substrates arranged inside the housing such that the first catalytic substrate is arranged upstream of the second catalytic substrate, and a reductant injector arranged in between the first and second catalytic substrates. Further, the first and second catalytic substrates are arranged such that a fluid flow direction through the exhaust gas aftertreatment device is angled. A flow redirecting wall is arranged downstream of the first catalytic substrate such that the fluid flow between the first and second catalytic substrates at least partially passes an outer circumference of the first catalytic substrate before reaching the second catalytic substrate. The redirecting wall is inclined to an outlet surface of the first catalytic substrate and the reductant injector is arranged at the redirecting wall at a position distant from the outlet surface.

17 Claims, 2 Drawing Sheets

(51) Int. Cl.
*F01N 3/20* (2006.01)
*F01N 13/00* (2010.01)
*F01N 3/10* (2006.01)

(52) U.S. Cl.
CPC ......... *F01N 3/2066* (2013.01); *F01N 13/009* (2014.06); *F01N 13/0097* (2014.06); *B01D 2255/904* (2013.01); *F01N 2240/20* (2013.01); *F01N 2470/24* (2013.01); *F01N 2490/06* (2013.01); *F01N 2510/06* (2013.01); *F01N 2610/1453* (2013.01); *Y02A 50/2325* (2018.01); *Y02T 10/24* (2013.01)

(56) References Cited

U.S. PATENT DOCUMENTS

2006/0008397 A1* 1/2006 Bruck .................. F01N 3/0231
422/180
2008/0041036 A1 2/2008 Witte-Merl
2008/0264048 A1* 10/2008 Nishiyama ......... B01D 53/9431
60/299

* cited by examiner

ANGLED AND COMPACT EXHAUST GAS AFTERTREATMENT DEVICE

CROSS-REFERENCE TO RELATED APPLICATIONS

This application claims foreign priority benefits under 35 U.S.C. § 119(a)-(d) to European patent application number EP 14174777.4, filed Jun. 27, 2014, which is incorporated by reference in its entirety.

TECHNICAL FIELD

The present disclosure relates to an exhaust gas aftertreatment device for an internal combustion engine. Embodiments according to the disclosure can be applied in passenger cars as well as in heavy duty vehicles such as trucks or buses.

BACKGROUND

In order to fulfil current stringent emission legislation more or less all vehicles with internal combustion engines are provided with an exhaust gas aftertreatment device comprising at least one catalytic converter substrate. A catalytic substrate generally comprises a channeled structure which exhaust gas can pass through while being exposed to the large surface area of the catalytic substrate. The channels of the catalytic substrates may be fluidly connected by perforating holes or like allowing gas to pass between adjacent channels. This enables gas to diffuse through the catalytic substrate structure. For petrol engines the most frequently used catalytic substrates are of Three Way Catalyst (TWC) type, while catalytic substrates of Diesel Oxidation Catalyst (DOC) type and/or Lean NOx Trap (LNT) type are the most frequently used catalytic substrates for diesel engines. It is also preferred that the TWC or the DOC/LNT is supplemented by a catalytic substrate with Selective Catalytic Reduction (SCR) functionality for improved NOx reduction. Typically, when using a catalytic substrate of SCR type a liquid or gaseous reductant is added to the exhaust gas emission flow before the exhaust gas enters the catalytic substrate of SCR type. The addition of reductant enables the catalytic reduction were NOx is reduced to diatomic nitrogen, N2, and water, H2O. Catalytic substrates combining the functionalities of more than one type of catalytic substrate in one catalytic substrate also exist.

Combining more than one catalytic substrate can be problematic since exhaust gas aftertreatment devices often are associated with design restrains due to the limited available space in the engine compartment. Thus, small exhaust gas aftertreatment devices are preferred from an engine packaging perspective, but small exhaust gas aftertreatment devices usually means that the flow distance between the inlet and the catalytic substrates of the exhaust gas aftertreatment device is limited. Limited distance means that the time and distance during which mixing of the exhaust gas emissions can occur is limited. Insufficient mixing of the exhaust gas emissions gives inhomogeneous exhaust gas emission mixture. This might e.g., be problematic for emission gas sensors, arranged in the exhaust gas emission flow, to work properly and give accurate emission measurements.

It is also desirable that positioning of the inlet and outlet of the exhaust gas aftertreatment device is flexible and that the inlet and outlet not necessarily have to be aligned. Compact design and flexible positioning of the inlet and outlet enables optimized and minimized packing volume.

Other problematic areas for exhaust gas aftertreatment devices are high back pressure and insufficient heating. High back pressure implies significant exhaust gas flow resistance. This is negative for the efficiency of the combustion engine resulting in a decrease of power output. Compensation of such decrease in power output leads to an increase in fuel consumption. If there is a difference in back pressure between two possible flow paths the flow through the flow path with lowest backpressure will be larger than the flow through the flow path with the higher backpressure. The flow ratio will be in proportion to the difference in back pressure. Heating of the catalytic substrate is crucial since the catalytic substrate is most effective at relatively high temperatures. Thus, it is desirable that the catalytic substrate reaches its optimum operation temperature as soon as possible and that the catalytic substrate stays warm during operation.

Insufficient mixing of the exhaust gas emissions are of particular interest if an exhaust gas aftertreatment device with a catalytic substrate with SCR functionality is used. When a liquid reductant is used it is also desirable that the liquid reductant is evaporated. Consequently, sufficient mixing and reductant evaporation is essential for the catalytic substrate with SCR functionality to work properly. A homogenous exhaust gas and reductant mix, and suitable ratio between exhaust gas and injected reductant, is also beneficial for the catalytic properties of catalytic substrates of SCR type. The mixing of injected reductant and exhaust gas is benefited by long distance between the reductant injecting device and the catalytic substrate of SCR type. The evaporation of injected reductant is also benefited by long distance between the injection of reductant and the subsequently provided catalytic converter of SCR type such that the injected reductant can be exposed to hot exhaust gas for a longer period of time. Thus, compact design directly contradicts other desirable properties of the exhaust gas aftertreatment device such as sufficient mixing.

US 2008/0041036 A1 discloses a method for adding at least one, in particular liquid, reactant to an exhaust gas stream of an internal combustion engine and a device for treating an exhaust gas stream of an internal combustion engine. According to US 2008/0041036 A1 an element, wherein the element may be a particulate filter or catalyst body, is arranged in an exhaust gas flow. Downstream of the element a nozzle may be provided spraying reactant flow onto the element such that a coating covering preferably at least 10% of the length of the element is formed. According to at least one embodiment the exhaust gas flow subsequently is redirected at a reversal region such that the exhaust gas flow is redirected to flow substantially opposite the entering exhaust gas flow before being discharged from the device. The device disclosed in US 2008/0041036 A1 has many advantages but is only provided with one catalytic substrate. Additionally US 2008/0041036 A1 fails to provide sufficient mixing of reactant and exhaust gas.

Thus, there is a need for further improvements.

SUMMARY

An object of the present disclosure is to provide a compact exhaust gas aftertreatment device, in particular a compact exhaust gas aftertreatment device with improved catalytic properties due to improved mixing and reductant evaporation characteristics. The exhaust gas aftertreatment device is provided in order to purify exhaust gas discharged from an internal combustion engine (ICE). By arranging two catalytic substrates close to each other in series, wherein the second catalytic substrate is of SCR type, and arranging the catalytic substrates such that the exhaust gas flow flowing through the first catalytic substrate angled relative an exhaust gas flow direction through the second catalytic substrate, a compact exhaust gas aftertreatment design is provided. Further advantages and advantageous features of the present disclosure are disclosed in the following description and in the dependent claims.

The exhaust gas aftertreatment device of the present disclosure is provided to be arranged downstream of an ICE such that exhaust gas discharged from the ICE can be purified. The exhaust gas aftertreatment device can be used both in vehicles with spark ignited engines and in vehicles with compression ignited engines. If the exhaust gas aftertreatment device is used in a vehicle with a diesel engine the first catalytic substrate is preferably of DOC type, LNT type or a combination thereof. If the exhaust gas aftertreatment device is used in a vehicle with a gasoline engine, or any other spark ignited fuels such as e.g., an ethanol based fuel, the first catalytic substrate may be of TWC type. In SCR systems a reductant is added to the exhaust gas flow in order for the substrate with SCR functionality to reduce NOx. The reductant, such as e.g., urea, anhydrous ammonia or aqueous ammonia, is added to the exhaust gas emission flow and such that it reacts with the NOx of the exhaust gas emissions.

The reductant evaporation is also benefitted by that the exhaust gas, and other components of the exhaust gas aftertreatment device, are warm. The catalytic substrates are generally also most efficient at higher temperatures. Thus, it is desirable that the cooling of the exhaust gas aftertreatment device and the exhaust gas is minimized.

The mixing of reductant and exhaust gas and the evaporation of the reductant is also dependent on the injection characteristics. Injecting the reductant opposite, or at least crossing, the flow direction of the exhaust gas flow is beneficial for the mixing characteristics. In embodiments where the reductant is injected over the surface of a catalytic substrate it is desirable that the reductant is evenly distributed over a large designated area.

The exhaust gas aftertreatment device of the present disclosure comprises a housing, a first and a second catalytic substrate and a reductant injector. The housing is provided to encapsulate the exhaust gas aftertreatment device. The first and second substrate are arranged inside the housing and the first catalytic substrate is provided upstream of the second catalytic substrate. Such arrangement provides that an exhaust gas flow discharged from an ICE provided up stream of the exhaust gas aftertreatment device will pass through the first catalytic substrate before passing the second catalytic substrate. The reductant injector is arranged in between the first and the second catalytic substrate such that reductant is added to the exhaust gas flow before the exhaust gas flow reaches the second catalytic substrate which preferably is of SCR type.

The first catalytic substrate is arranged such that a fluid flow, according to the present disclosure in form of an exhaust gas flow, passes the first catalytic substrate in a first main flow direction, and the second catalytic substrate is arranged such that a fluid flow passes the second catalytic substrate in a second main flow direction, wherein the first and second main flow directions are angled to each other. An angled design provides flexibility when it comes to vehicle packaging requirements. Further, a flow redirecting wall is arranged downstream of the first catalytic substrate, whereby a fluid flow, preferably exhaust gas discharged from an ICE, between the first catalytic substrate and the second catalytic substrate at least partially is redirected such that the fluid flow passes an outer circumference of the first catalytic substrate before reaching the second catalytic substrate. The redirecting wall is inclined to an outlet surface of the first catalytic substrate with a first angle. The redirecting wall is thereby inclined in relation to the first main flow direction out of the first catalytic substrate such that the fluid flow approaching the redirecting wall may perform a rotational movement. The reductant injector is arranged at the redirecting wall at a position with a first distance, in the first main flow direction of the first catalytic substrate, which is further away from the outlet surface than an average distance between the outlet surface and the redirecting wall. The reductant injector is directed with a second angle to the outlet surface of the first catalytic surface. The redirecting wall may also be provided with a catalytic surface providing additional emission degrading properties.

A two catalytic substrate exhaust gas aftertreatment device with as compact design as of the present disclosure, which normally would imply short distance between the two catalytic substrates, would normally be problematic due to insufficient mixing. However the redirecting wall of the present disclosure enables that exhaust gas is at least partially redirected and is passing the outer circumference of the first catalytic substrate before reaching the second catalytic substrate. Arranging the reductant injector at the redirecting wall also improves evaporation of reductant. Arranging the reductant upstream of the outer circumference from a flow direction perspective also ensures that the distance during which mixing can occur before reaching the second catalytic substrate is sufficient.

Arranging the reductant injector at the first end of the inclined redirecting wall enables that the reductant injector can be arranged further away from the outlet surface of the first catalytic substrate, whereby the reductant will mix with and be exposed to hot exhaust gases for a longer period of time before reaching the outlet surface. It also enables that the first angle can be provided such that the reductant can be distributed over a larger area of the outlet surface than would have been possible if the reductant injector e.g., was provided at a position centrally of the redirecting wall. Both increased mixing and exposure to hot exhaust gas and the distribution of reductant over a larger surface are beneficial for the evaporation characteristics.

The redirection of the exhaust gas by the redirecting wall does not only prolong the distance between the first and second catalytic substrate, by directing the hot exhaust gas such that the exhaust gas pass the outer circumference of the first catalytic substrate before reaching the second catalytic substrate the cooling of the first catalytic substrate will be minimized.

According to one aspect of the present disclosure the redirecting wall is directing the exhaust gas flow such that at least a main part of the fluid flow between the first catalytic substrate and the second catalytic substrate is directed in an opposite direction from the first main flow direction of the first catalytic substrate. As previously stated, injecting reductant opposite the exhaust gas flow is beneficial for the exhaust gas and reductant mixing.

Further, the redirecting wall is provided with a first and a second end, wherein the ends are provided essentially opposite each other. The first end is a point of the redirecting wall furthest away from the outlet surface of the first catalytic substrate and the second end is a point of the redirecting wall positioned closest to the outlet surface of the first catalytic substrate. Both the first end and the second end are arranged in level with an outer circumference of the first substrate.

Arranging the first and the second end accordingly provides that the redirecting wall is inclined as of the present disclosure.

The outer surface of the housing formed by the redirecting wall may e.g., be rounded or spherically shaped. The important feature of the surface is that it enables the redirecting wall to be provided such that a first and a second end is formed, wherein the first end is provided at a longer distance from the outlet surface of the first catalytic substrate than the second end, such that the redirected wall is inclined.

According to one aspect of the present disclosure the reductant injector is arranged at a vicinity of the first end of the redirecting wall. Arranging the reductant injector at the first end provides best possible injection characteristics allowed by the design of the exhaust gas aftertreatment. As previously stated, in embodiments where the reductant is injected over the surface of a catalytic substrate it is desirable that the reductant is evenly distributed over a large designated area. By arranging the reductant injector far away from the outlet surface this is achieved.

According to another aspect of the exhaust gas aftertreatment device the second catalytic substrate is arranged in the vicinity of the second end.

According yet another aspect of the present disclosure the redirecting wall is provided with at least one guiding means. The guiding means enables that the fluid flow from the first catalytic substrate is directed over at least a portion of the outer circumference of the first catalytic substrate before reaching the second catalytic substrate. The guiding means are provided such that at least a portion of the fluid flow is directed to the redirecting wall. At the redirecting wall the fluid flow will be redirected to flow over at least a portion of the outer circumference of the first catalytic substrate. Thus, the guiding means prevents the fluid flow to, after passing the first catalytic substrate, directly flow to the second catalytic substrate without passing at least a portion of the outer circumference of the first catalytic surface. This will secure that the fluid flow is at least partially mixed with injected reductant before reaching the second catalytic substrate.

The larger the guiding means is the larger portion of the fluid flow is forced to flow over the outer circumference of the first catalytic substrate.

The guiding means is disclosed more in detail in the detailed description.

According to one aspect of the present disclosure the guiding means seals against the housing and seals against the outer circumference of the first substrate such that a fluid flow passing the first catalytic substrate is fully redirected at the redirecting wall to pass the outer circumference of the first catalytic substrate.

The channeled structure of a catalytic substrate forms a main flow direction through the catalytic substrate. According to a preferred aspect of the present disclosure the exhaust gas aftertreatment device is arranged in an angle of essentially 90 degrees. Such arrangement may be advantageous from a vehicle packaging perspective. Thus, according to one aspect of the present disclosure the first main flow direction through the first catalytic substrate and the second main flow direction through the second catalytic substrates are essentially perpendicular to each other. Thus, after passing the first catalytic substrate the exhaust gas flow will be redirected at the redirecting wall and subsequently by passing the outer circumference of the first catalytic substrate such that the exhaust gas flow enters and flows through the second catalytic substrate in a main flow direction essentially perpendicular to the first main flow direction through the first catalytic substrate. According to still one aspect of the present disclosure the first catalytic substrate is provided with a diameter essentially corresponding to a length, in the first main flow direction, of the first catalytic substrate. Such arrangement provides a compact exhaust gas aftertreatment design with favorable backpressure characteristics and excellent packaging properties. High back pressure is disadvantageous from a fuel consumption and engine efficiency perspective. The large flow through surface of the latter aspect of the present disclosure provides a low backpressure.

According to another aspect of the present disclosure the reductant injector is a high pressure injector injecting reductant at pressures higher than what conventionally is used for injection of reductant in SCR systems. According to a preferred aspect may such higher pressures be between 25 and 75 bar. According to yet an even more preferred aspect of the present disclosure may such higher pressure be essentially 50 bar. High injection pressure provides that the reductant can be distributed as smaller droplets, over a larger surface area and that the reductant can be added in shorter injection pulses. High pressure injectors also provide that the injected reductant better can penetrate an exhaust gas flow, enabling that a surface provided at a distance from a reductant injector still can be reached. This is e.g., desirable in configurations where the reductant is injected essentially in a direction opposite the exhaust gas flow. For some aspects of the present disclosure the reductant injectors may be of air pressure assisted type.

As previously stated, in order for a catalytic substrate to be as effective as possible it is desirable that the exhaust gas flow through a catalytic substrate is homogenous. This can be accomplished either by providing such that the flow entering the catalytic substrate is homogenous or such that the flow is homogenously distributed in the catalytic substrate. Thus, according to one aspect of the present disclosure the flow through properties of the second substrate is adapted such that the flow through the second catalytic substrate is essentially homogenous.

According to yet one aspect of the present disclosure the outlet surface of the first catalytic substrate is provided with a surface configured to protect against corrosion or like. The surface is also preferably configured to contribute to the degradation of the injected reductant. As previously stated, it is desirable that the reductant is completely evaporated. The higher the degree of evaporated reductant is the more efficient will the NOx reduction be at the second catalytic substrate of SCR type. The first catalytic substrate will be heated by the hot exhaust gas, discharged from the ICE, flowing through the first catalytic substrate. Additionally, the cooling of the outer portions of the first catalytic substrate will be minimized due to the redirected exhaust gas passing the outer circumference of the first catalytic substrate. Thus, the first catalytic substrate will have a substantially homogenous temperature. Consequently, the evaporation of reductant will be improved by spraying reductant onto the warm surface of the first catalytic substrate.

According to one aspect of the present disclosure the surface is configured to resist a spray of injected reductant by applying a hydrolytic coating on the surface, improving the emission degrading properties of the first catalytic substrate even more. According to other aspects of the present disclosure other coatings are used such as e.g., coatings improving the durability.

The present disclosure also comprises a vehicle provided with an exhaust gas aftertreatment device according to the present disclosure.

BRIEF DESCRIPTION OF THE DRAWINGS

Aspects of the present disclosure will now be described with reference to the appended figures, wherein.

It should be noted that the following description of the aspects of the present disclosure is for illustration purposes only and should not be interpreted as limiting the disclosure exclusively to these aspects.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1B:
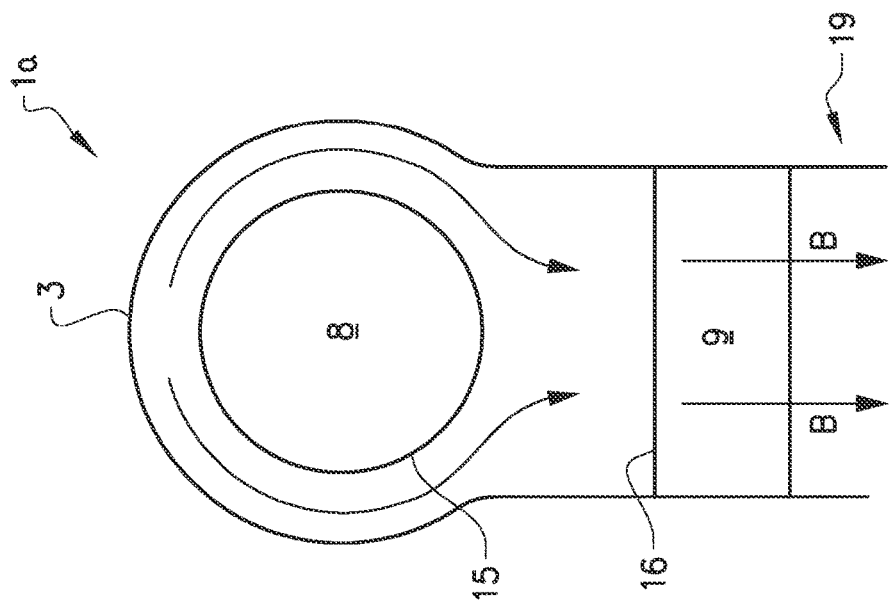
FIGS. 1A and 1B show a first aspect of an exhaust gas aftertreatment device according to the present disclosure.
Figure 1A:
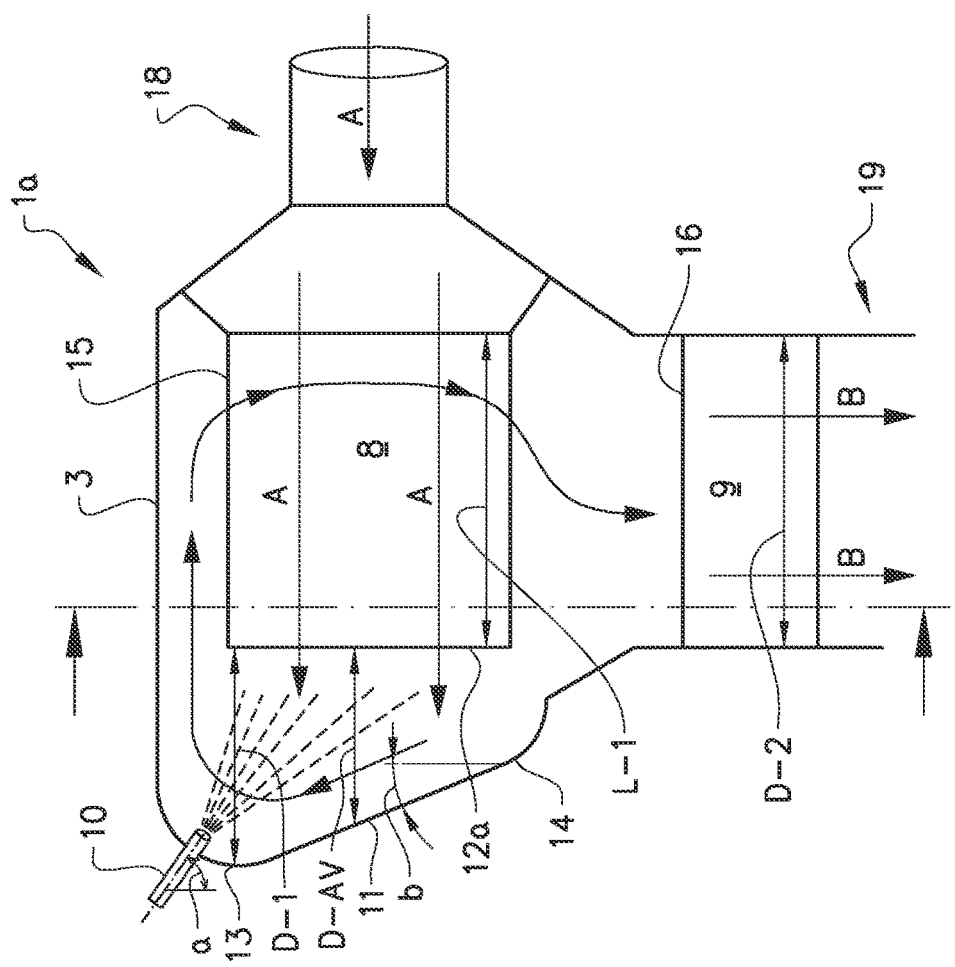

FIG. 1A discloses a first embodiment of a compact exhaust gas aftertreatment device 1a according to the present disclosure provided to receive exhaust gas discharged from an ICE at an inlet portion 18 of the exhaust gas aftertreatment device 1a. The exemplary exhaust gas aftertreatment device 1a comprises a first catalytic substrate 8 and a second catalytic substrate 9 of SCR type. The first catalytic substrate 8 may be of DOC type, LNT type or a combination thereof.

It is generally desirable that exhaust gas aftertreatment devices, even when comprising two catalytic substrates, are as compact as possible due to the limited space in vehicles for mounting such device. However, compact, two substrate exhaust gas aftertreatment devices generally means that the distance between the substrates is limited which may be problematic e.g., from an exhaust gas mixing perspective. Where catalytic substrates of SCR types are used compact arrangements may also be problematic since evaporation and reductant/exhaust gas mixing characteristics may be neglected.

According to the aspect of the present disclosure disclosed in FIG. 1A the discharged exhaust gas enters the exhaust gas aftertreatment device 1a in a first main flow direction A of the first catalytic substrate 8. The exhaust gas aftertreatment device 1a is further provided with a housing 3, encapsulating the exhaust gas aftertreatment device 1a, and a reductant injector 10 provided to inject reductant upstream of the second catalytic substrate 9. The housing 3 forms a redirecting wall 11 provided between the first and the second catalytic substrates 8, 9. At the redirecting wall 11 the exhaust gas flow is redirected such that the exhaust gas will turn to flow in a flow direction essentially opposite the first main flow direction A and subsequently turn additionally to flow in a second main flow direction B, wherein B is essentially perpendicular to the first main flow direction A. The first catalytic substrate 8 is provided such that an outer circumference 15 of the first catalytic substrate 8 is provided within and at a distance from the housing 3, wherein the redirected exhaust gas flow passes the outer circumference 15 of the first catalytic substrate 8 when being redirected and turning from the first main flow direction A to the second main flow direction B.

According to the exemplary aspect of an exhaust gas aftertreatment device 1a disclosed in FIG. 1A the first main flow direction A of the first catalytic substrate 8 is essentially perpendicular to the second main flow direction B of the second catalytic substrate 9, wherein an outlet portion 19 of the exhaust gas aftertreatment device 1a is essentially perpendicular to the inlet portion 18. Consequently, an inlet surface 16 of the second catalytic substrate 9 is essentially parallel to the first catalytic substrate 8 and the first main flow direction A.

The redirecting wall 11 is provided with a first end 13 and a second end 14 arranged essentially opposite each other. The reductant injector 10 is provided at the first end 13. Further, the first catalytic substrate 8 comprises an outlet surface 12a, wherein a distance D-1 between the first end 13 and the outlet surface 12a in the first main flow direction A is longer than an average distance D-AV in the first main flow direction A between the outlet surface 12a and the redirecting wall 11. The reductant injector 10 is directed with a first angle a to the outlet surface 12a of the first catalytic substrate and the redirecting wall is inclined with an angle b to the outlet surface 12a.

That the redirecting wall is inclined with the angle b in regards to the outlet surface 12a and that the reductant injector 10 is directed towards the outlet surface 12a with the angle a enables that the reductant injector 10 is provided further away from the outlet surface 12a, than would be possible if the redirecting wall and the outlet surface 12 where arranged in parallel, and that reductant can be injected over a larger area of the outlet surface 12a, than would be possible if the reductant injector 10 was arranged somewhere in the middle of the first and second ends 13, 14.

The exemplary embodiment disclosed in FIG. 1A provides a compact exhaust gas aftertreatment device 1a. The redirection of the exhaust gas flow at the redirecting wall 11 provides that sufficient mixing is obtained before reaching the second catalytic substrate 9 since that distance during which mixing can occur is prolonged. Additionally, by arranging the reductant injector 10 at the first end 13, which is provided as far away from the outlet surface 12a as the design allows the evaporation of the injected reductant and the mixing of reductant and exhaust gas is maximized.

According to the aspect of the present disclosure disclosed in FIG. 1A the first catalytic substrate 8 has a length L-1 which is about equal to a diameter D-2 of the second catalytic substrate 9.

FIG. 1B shows a cross sectional view of the exemplary aspect of the exhaust gas aftertreatment device 1a of the present disclosure disclosed in FIG. 1A, visualizing the movement of the exhaust gas flow when passing the outer circumference 15 of first catalytic substrate 8. After passing the outer circumference 15 of first catalytic substrate 8 on the inside of the housing 3, the exhaust gas flow will pass the second catalytic substrate 9 in the second main flow direction B of the second catalytic substrate 9.

Figure 2B:
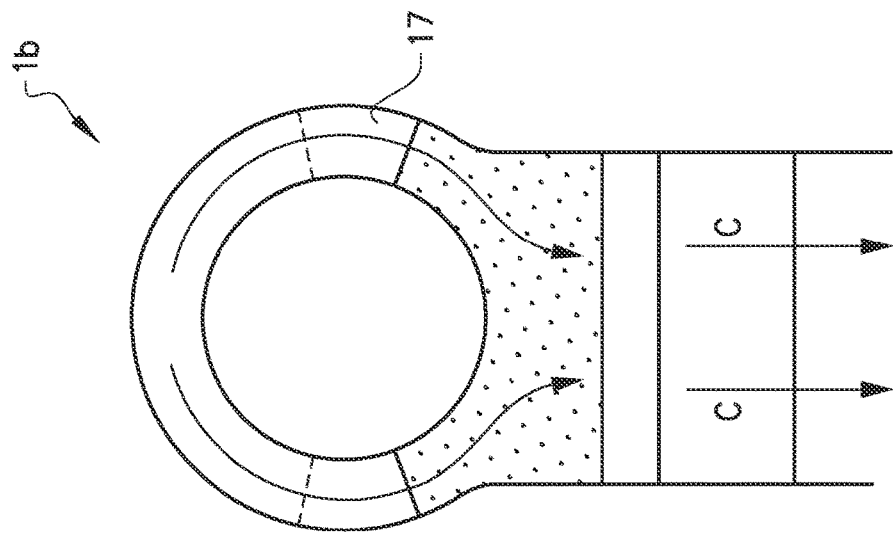
FIGS. 2A and 2B show a second aspect of an exhaust gas aftertreatment device according to the present disclosure.
Figure 2A:
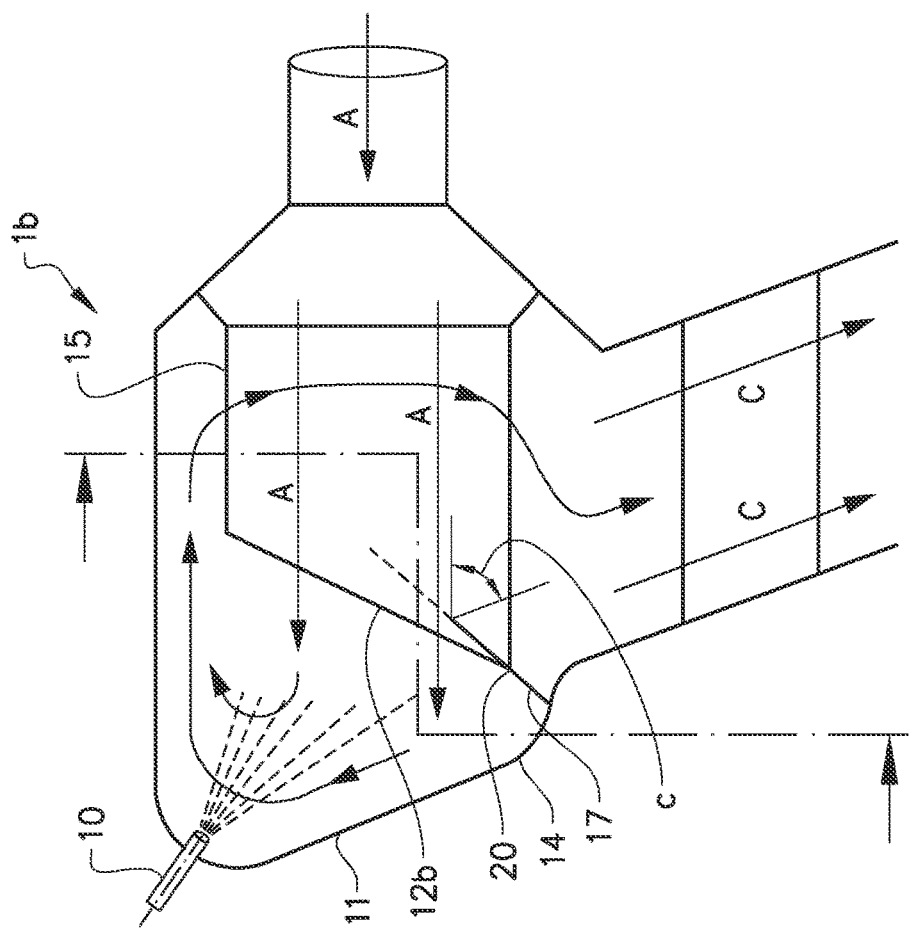

FIG. 2A shows a second embodiment of an exhaust gas aftertreatment device 1b according to the present disclosure. One feature of the embodiment of the disclosure shown in FIG. 2A that is configured differently than for the embodiment disclosed in FIGS. 1A and 1B is the outlet surface 12b of the first catalytic substrate 8. The outlet surface 12a of the embodiment of FIG. 1A is perpendicular to the first flow direction A through the first catalytic substrate 8 whereas the outlet surface 12b of the embodiment of FIG. 1B is inclined in an angle c which is less than 90 degrees. The configuration of the outlet surface 12b enables that a larger surface area of the outlet surface 12b is facing the reductant injector 10. Corresponding to what previously has been described in relation to FIGS. 1A and 1B reductant is injected, by spraying, into the exhaust gas flow by a reductant injector 10. The configuration of the outlet surface 12b increases the distance between the reductant injector 10 and the outlet surface 12b, which will prolong the time and distance for reductant evaporation and mixing. If unevaporated reductant still reaches the outlet surface 12b the configuration of the outlet surface 12b enables that unevaporated reductant is more evenly distributed over the outlet surface 12b. The evaporation of the unevaporated reductant reaching the outlet surface 12b of the first catalytic substrate 8 is promoted by that the first catalytic substrate 8 is heated by the hot exhaust gas flow. Thus, the configuration of the outlet surface 12b is beneficial from an reductant evaporation standpoint both due to the prolonged distance for mixing and evaporation and due to the larger surface facing the reductant injector.

The exhaust gas aftertreatment device 1b of the exemplary aspect of the present disclosure shown in FIG. 2A additionally comprises guiding means 17. According to the aspect of the disclosure shown in FIG. 2A the guiding means 17 is arranged such that the guiding means 17 seals against the redirecting wall 11, at a position adjacent to the rear end 14, and at a rear edge 20, provided adjacent to the outlet surface 12b of the outer circumference 15 of the first catalytic substrate 8. The guiding means 17 provide that at least a portion of the exhaust gas flow after passing the first catalytic substrate 8 is forced to the redirecting wall 11 where it will be redirected to pass the outer circumference 15 of the first catalytic substrate 8. The larger guiding means 17 that are used, the larger portion of the exhaust gas flow from the first catalytic substrate 12b is forced to pass the outer circumference 15. The arrangement comprising guiding means 17 may improve the mixing of exhaust gas flow and injected reductant and can be used to secure that no exhaust gas flow can flow directly from the first catalytic substrate 8 to the second catalytic substrate 9, without at least passing a small portion of the outer circumference 15.

Further, according to the exemplary aspect of the present disclosure shown in FIG. 2A an angle c between the first main flow direction A of the first catalytic substrate 8 and a third main flow direction C of the second catalytic substrate 9 is less than 90 degrees. Depending on design and related packaging requirements of the vehicle arranging the second catalytic substrate essentially perpendicular in regards to the first catalytic substrate may be problematic or even impossible. Thus, such arrangement, where the angle is less than 90 degrees, as well as aspects where the angle is more than 90 degrees, may be advantageous for different vehicle designs with different packaging requirements.

FIG. 2B discloses a cross sectional view of the exemplary aspect of the exhaust gas aftertreatment device 1b of the present disclosure disclosed in FIG. 2A. FIG. 2B shows the same features as FIG. 1B with the exception that the guiding means 17 of the aspect of the disclosure shown in FIG. 2A is shown.

All of the differently configured features disclosed in FIGS. 2A and 2B can be implemented independently of each other. Thus, it is within the scope of the present disclosure to apply any number of the differently configured features e.g., to the aspect of the present disclosure disclosed in FIGS. 1A and 1B.

The foregoing disclosure has been set forth merely to illustrate embodiments according to the present disclosure and is not intended to be limiting. All figures are schematically illustrated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An exhaust gas aftertreatment device for an internal combustion engine (ICE), the exhaust gas aftertreatment device comprising:
    a housing;
    first and second catalytic substrates arranged inside the housing such that the first catalytic substrate is upstream of the second catalytic substrate, wherein the first catalytic substrate is arranged to have a first main flow direction, and the second catalytic substrate is arranged to have a second main flow direction, wherein the first and second main flow directions are angled relative to each other;
    a reductant injector arranged in between the first and second catalytic substrates; and
    a flow redirecting wall arranged downstream of the first catalytic substrate such that a fluid flow between the first catalytic substrate and the second catalytic substrate will at least partially pass an outer circumference of the first catalytic substrate before reaching the second catalytic substrate;
    wherein the redirecting wall has a surface that is inclined relative to and substantially commensurate with an outlet surface of the first catalytic substrate, and the reductant injector is arranged at the redirecting wall at a position at which the redirecting wall is spaced from the outlet surface at a first distance, in the first main flow direction of the first catalytic substrate, which is greater than an average distance between the outlet surface and the redirecting wall, and wherein the reductant injector is directed at an angle relative to the outlet surface.

2. The exhaust gas aftertreatment device according to claim 1 wherein the redirecting wall is provided with first and second ends essentially opposite each other, and the first end is a point of the redirecting wall furthest away from the outlet surface of the first catalytic substrate, and the second end is a point of the redirecting wall positioned closest to the outlet surface of the first catalytic substrate, wherein both the first end and the second end are arranged in level with an outer circumference of the first substrate.

3. The exhaust gas aftertreatment device according to claim 2 wherein the reductant injector is arranged at the first end.

4. The exhaust gas aftertreatment device according to claim 1 wherein the redirecting wall is provided with a guiding means configured to enable the fluid flow from the first catalytic substrate to be directed over at least a portion of the outer circumference of the first catalytic substrate before reaching the second catalytic substrate.

5. The exhaust gas aftertreatment device according to claim 1 wherein an inlet surface of the second catalytic substrate is arranged essentially parallel with the first main flow direction through the first catalytic substrate and is provided with a diameter essentially corresponding to a length of the first catalytic substrate.

6. The exhaust gas aftertreatment device according to claim 1 wherein the reductant injector is a high pressure injector configured to inject reductant with a pressure between 25 and 75 bar.

7. The exhaust gas aftertreatment device according to claim 1 wherein the first and second main flow directions through the first and second catalytic substrates are essentially perpendicular to each other.

8. The exhaust gas aftertreatment device according to claim 1 wherein the outlet surface of the first catalytic substrate is provided with a hydrolytic coating.

9. A vehicle provided with an exhaust gas aftertreatment device according to claim 1.

10. An exhaust gas aftertreatment device for an internal combustion engine (ICE), the exhaust gas aftertreatment device comprising:
   a housing;
   first and second catalytic substrates arranged inside the housing such that the first catalytic substrate is upstream of the second catalytic substrate, wherein the first catalytic substrate is arranged to have a first main flow direction, and the second catalytic substrate is arranged to have a second main flow direction, wherein the first and second main flow directions are angled relative to each other;
   a reductant injector arranged in between the first and second catalytic substrates; and
   a flow redirecting wall arranged downstream of the first catalytic substrate such that a fluid flow between the first catalytic substrate and the second catalytic substrate will at least partially pass an outer circumference of the first catalytic substrate before reaching the second catalytic substrate;
   wherein the redirecting wall is inclined relative to an outlet surface of the first catalytic substrate, and the reductant injector is arranged at the redirecting wall at a position at which the redirecting wall is spaced from the outlet surface at a first distance, in the first main flow direction of the first catalytic substrate, which is greater than an average distance between the outlet surface and the redirecting wall, and wherein the reductant injector is directed at an angle relative to the outlet surface;
   wherein the redirecting wall is provided with first and second ends essentially opposite each other, and the first end is a point of the redirecting wall furthest away from the outlet surface of the first catalytic substrate, and the second end is a point of the redirecting wall positioned closest to the outlet surface of the first catalytic substrate, wherein both the first end and the second end are arranged in level with an outer circumference of the first substrate.

11. The exhaust gas aftertreatment device according to claim 10 wherein the reductant injector is arranged at the first end.

12. The exhaust gas aftertreatment device according to claim 10 wherein the redirecting wall is provided with a guiding means configured to enable the fluid flow from the first catalytic substrate to be directed over at least a portion of the outer circumference of the first catalytic substrate before reaching the second catalytic substrate.

13. The exhaust gas aftertreatment device according to claim 10 wherein an inlet surface of the second catalytic substrate is arranged essentially parallel with the first main flow direction through the first catalytic substrate and is provided with a diameter essentially corresponding to a length of the first catalytic substrate.

14. The exhaust gas aftertreatment device according to claim 10 wherein the reductant injector is a high pressure injector configured to inject reductant with a pressure between 25 and 75 bar.

15. The exhaust gas aftertreatment device according to claim 10 wherein the first and second main flow directions through the first and second catalytic substrates are essentially perpendicular to each other.

16. The exhaust gas aftertreatment device according to claim 10 wherein the outlet surface of the first catalytic substrate is provided with a hydrolytic coating.

17. A vehicle provided with an exhaust gas aftertreatment device according to claim 10.

* * * * *